United States Patent
Nagaishi et al.

(10) Patent No.: US 11,509,051 B2
(45) Date of Patent: Nov. 22, 2022

(54) RADAR SENSOR

(71) Applicant: Hitachi Automotive Systems, Ltd., Hitachinaka (JP)

(72) Inventors: Hideyuki Nagaishi, Tokyo (JP); Akira Kitayama, Ibaraki (JP); Hiroshi Kuroda, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 268 days.

(21) Appl. No.: 16/959,026

(22) PCT Filed: Nov. 16, 2018

(86) PCT No.: PCT/JP2018/042400
§ 371 (c)(1),
(2) Date: Jun. 29, 2020

(87) PCT Pub. No.: WO2019/187317
PCT Pub. Date: Oct. 3, 2019

(65) Prior Publication Data
US 2020/0358178 A1    Nov. 12, 2020

(30) Foreign Application Priority Data

Mar. 28, 2018    (JP) .............................. JP2018-061778

(51) Int. Cl.
*H01Q 3/26*    (2006.01)
*H01Q 21/22*    (2006.01)

(52) U.S. Cl.
CPC ............. *H01Q 3/267* (2013.01); *H01Q 21/22* (2013.01)

(58) Field of Classification Search
CPC ........ H01Q 3/267; H01Q 21/22; G01S 13/58; G01S 7/03; G01S 13/426; G01S 13/931; G01S 7/4008
See application file for complete search history.

(56) References Cited

U.S. PATENT DOCUMENTS 5,412,414 A    5/1995 Ast et al.
5,809,087 A    9/1998 Ashe et al.
(Continued)

FOREIGN PATENT DOCUMENTS

JP    8-226962 A    9/1996
JP    11-225014 A    8/1999
(Continued)

OTHER PUBLICATIONS

International Search Report (PCT/ISA/210) issued in PCT Application No. PCT/JP2018/042400 dated Feb. 12, 2019 with English translation (four (4) pages).
(Continued)

*Primary Examiner* — Jinsong Hu
*Assistant Examiner* — Rui M Hu
(74) *Attorney, Agent, or Firm* — Crowell & Moring LLP

(57) ABSTRACT

A reception power supplying unit generates each of reception signals before and after a switching operation. A signal processing circuit generates each of difference signals before and after the switching operation on the basis of the reception signal and a reference signal. A phase difference detector calculates, as a transmission phase difference, the phase difference between transmission power supplying units on the basis of the respective difference signals, and adjusts a phase shift amount on the basis of the transmission phase difference and a set phase difference that is previously set.

14 Claims, 9 Drawing Sheets

(56) References Cited

U.S. PATENT DOCUMENTS

| | | | | |
|---|---|---|---|---|
| 8,791,854 | B2* | 7/2014 | Forstner | G01S 7/02 |
| | | | | 342/175 |
| 9,778,350 | B2* | 10/2017 | Schoor | H01Q 3/2605 |
| 9,880,262 | B2* | 1/2018 | Hayakawa | H01Q 3/267 |
| 10,955,528 | B2* | 3/2021 | Zanati | H01Q 3/38 |
| 2001/0005685 | A1* | 6/2001 | Nishimori | H01Q 3/2605 |
| | | | | 455/562.1 |
| 2007/0152868 | A1 | 7/2007 | Schoebel | |
| 2011/0134001 | A1* | 6/2011 | Sakata | G01R 29/105 |
| | | | | 343/703 |
| 2012/0050094 | A1 | 3/2012 | Nakabayashi et al. | |
| 2015/0226838 | A1* | 8/2015 | Hayakawa | H01Q 1/3233 |
| | | | | 342/70 |
| 2016/0109559 | A1* | 4/2016 | Delbecq | G01S 13/931 |
| | | | | 342/170 |
| 2017/0012349 | A1 | 1/2017 | Lee et al. | |
| 2017/0170560 | A1* | 6/2017 | Ookawa | G01S 7/35 |
| 2017/0234971 | A1* | 8/2017 | Arai | H04B 17/12 |
| | | | | 342/174 |
| 2018/0053998 | A1* | 2/2018 | Ashida | H01Q 3/267 |
| 2019/0178983 | A1* | 6/2019 | Lin | G01S 7/4021 |
| 2019/0235050 | A1* | 8/2019 | Maligeorgos | G01S 7/032 |
| 2020/0389285 | A1* | 12/2020 | Nuimura | G01R 29/10 |
| 2021/0080556 | A1* | 3/2021 | Ogura | G01S 13/34 |
| 2022/0057482 | A1* | 2/2022 | Fritzin | G01S 13/003 |

FOREIGN PATENT DOCUMENTS

| | | |
|---|---|---|
| JP | 2003-66134 A | 3/2003 |
| JP | 2003-315445 A | 11/2003 |
| JP | 2006-516370 A | 6/2006 |
| JP | 2012-52928 A | 3/2012 |
| JP | 2013-205043 A | 10/2013 |
| JP | 2015-152335 A | 8/2015 |

OTHER PUBLICATIONS

Japanese-language Written Opinion (PCT/ISA/237) issued in PCT Application No. PCT/JP2018/042400 dated Feb. 12, 2019 (three (3) pages).

* cited by examiner

RADAR SENSOR

TECHNICAL FIELD

The present invention relates to a radar sensor that generates a narrow angle beam.

BACKGROUND ART

In an automobile, a railroad car, infrastructure equipment, and the like, a Doppler sensor or a radar sensor that uses an electric wave is installed as a surrounding state detection sensor. For example, a plurality of radar sensors that have different detection distances and detection angle ranges are used for the automobile to cover all surroundings of the automobile toward the achievement of safe driving assistance and autonomous driving.

For an antenna of the radar sensor, there are a method for mechanically directing the antenna itself or a reflector plate that reflects an electric wave radiated from the antenna and a method for scanning the in phase plane direction of a radiated electric wave by electrically shifting the phases between antenna elements configuring the antenna. Of these, as the antenna that performs the scanning by using the phase difference between the antenna elements, for example, the following patent gazettes 1 to 4 are disclosed.

In Patent Literature 1, an antenna includes patch antennas, a power supply wiring, and an upper dielectric, and the phase delay amount according to the wiring length between patch elements is controlled to achieve beam scanning. The delay amount caused by the wiring length between the patch elements is controlled by a method for changing the effective dielectric constant of the wiring formed on an antenna substrate according to the relative position with the upper dielectric and a method for changing the frequency (wavelength) of an electric wave radiated. The antenna of Patent Literature 1 can scan the radiation direction by using each or both of these methods.

Patent Literature 2 discloses an antenna that includes a plurality of antennas, determination means for determining a mounting direction, and a phase adjusting unit that adjusts a phase, and selectively controls the phase parameter of the phase adjusting unit according to the means for determining the mounting direction of a radar.

An antenna of Patent Literature 3 is configured such that the terminal end of a transmission antenna is connected to a reception point via a correction line and a switch. The antenna of Patent Literature 3 detects the phase change amount of a transmission signal at the reception point, and corrects the dielectric phase of the transmission signal. Patent Literature 4 discloses an antenna that includes a plurality of waveguide slot antennas stacked and disposed in the vertical direction, a rotary joint, and a phase shifter, connects the waveguide slot antennas by the rotary joint, and scans the horizontal direction by shifting the phase of an electric wave supplying an electric power to each of the waveguides by using the phase shifter.

CITATION LIST

Patent Literature

Patent Literature 1: Japanese Translation of PCT International Application Publication No. 2006-516370
Patent Literature 2: Japanese Unexamined Patent Application Publication No. 2015-152335
Patent Literature 3: Japanese Unexamined Patent Application Publication No. 2012-52928
Patent Literature 4: Japanese Unexamined Patent Application Publication No. 2003-66134

SUMMARY OF INVENTION

Technical Problem

For example, in order that the automobile can be safely stopped during the high-speed traveling at a speed of 200 km per hour, the radar sensor desirably has a maximum detection distance of at least 200 m or more. In this case, the antenna of the radar sensor is required to secure a detection range in the horizontal direction that is ±8 deg or more. Also, to obtain the high gain characteristic, the antenna is required to generate, for example, a narrow angle beam whose antenna half value width in the vertical direction is ±2 deg or less.

However, there is the case where the weighing balance is changed according to the number of riding persons and the loading position of a load to tilt the vehicle and consequently, the levelness cannot be maintained, the radiation direction of the beam is tilted. For example, in the use of the antenna whose half value width in the vertical direction is ±2 deg, when the vehicle is tilted by 3 deg, the antenna gain is reduced by approximately 5 dB, and the maximum detection distance is 0.75 times itself, so that the radar sensor whose detection distance is 200 m can detect only up to approximately 150 m.

Also, the radiation direction of the radar sensor is affected by the tilt of the vehicle, but can also be affected by the temperature characteristic of the radar sensor and by the radome covering the antenna of the radar sensor, the vehicle cover, the bumper, and the like. Further, the transmission signal passes through the electric power amplifier, the phase shifter, the wiring, and the like by the time the transmission signal is fed from the transmitter of the RF circuit to the plurality of antennas, and consequently, the radiation direction can also be affected by these.

In order that the narrow angle beam of the radar sensor is directed to the desired beam direction, the phase difference between the antenna aperture surfaces of the respective antenna elements is required to be controlled. For this, it is important to detect the phase of the electric wave radiated from the antenna aperture surface.

For example, in Patent Literature 2, a calibration parameter is prepared to control the antenna radiation direction, and the radiation direction is controlled by using the calibration parameter.

However, the electric power amplifier, the phase shifter, and the wiring are changed in the electric characteristic due to the temperature, and the electric power amplifier that includes an active element and the like are changed in the phase according to the set amplification degree, so that a plurality of calibration parameters based on the temperature characteristic and the set value of the active element are required. Further, when the radar is mounted in the vehicle, the cover and the bumper are installed around the radar, so that correction data after they are installed into the vehicle are also required. However, it is difficult to store all the calibration parameters according to the vehicle weight balance, the temperature, and the radar operation set value, and the inspection cost increases. Also, in the conventional radar sensor, the radiation direction of the transmission antenna cannot be calibrated. The radiation direction of the transmission antenna can be estimated to some extent on the basis of the intensity of the reflection wave signal from the target, but the signal intensity is unstable in the scattering body, such as the automobile, and consequently, the accuracy is not sufficient.

The antenna disclosed in Patent Literature 1 is provided with the phase shifter based on the change in the position of the upper dielectric, but does not have means for detecting the phase difference in the radiation direction, and consequently, the calibration of the radiation direction cannot be performed. Due to this, it is difficult to control the radar radiation direction at high accuracy when the antenna is mounted in the vehicle.

The antenna disclosed in Patent Literature 2 can perform the phase setting by using the calibration parameter according to the installation direction. However, the antenna does not have means for determining whether this calibration parameter can be used for the high accuracy control of the beam direction also after the antenna is mounted in the vehicle. Also, the inspection cost for obtaining various calibration parameters, such as the temperature characteristic, is huge.

In Patent Literature 3, the phase change amount of the transmission signal can be detected at the reception point, but instead of using the phase shifter, the beam direction is scanned by changing the frequency of the transmission electric wave, which is not means for detecting the phase difference between the plurality of transmission antennas. Also, when a plurality of transmission antennas are configured, a plurality of correction lines are also required to be disposed, and the difference in the wiring length between the correction lines and the substrate temperature characteristic are also required to be considered. Also, the switch is located on the reception side, and the electric wave is radiated from the antenna element on the transmission side at all times, so that the phase difference between the aperture surfaces of the respective transmission antennas cannot be detected.

Patent Literature 4 includes the waveguide slot antennas and the phase shifter, but does not have switches that activate the individual antennas, and cannot detect the phase difference between the antenna aperture surfaces.

In this way, the conventional radar sensor cannot detect the phase of the electric wave radiated from each of the antenna aperture surfaces, and cannot control the radiation direction.

Accordingly, an object of the present invention is to provide a radar sensor that can control a beam radiation direction at high accuracy.

Solution to Problem

An overview of the representative invention among the inventions disclosed herein will be briefly described as follows.

A radar sensor according to a representative embodiment of the present invention includes a signal processing circuit that feeds a reference signal, a plurality of transmission power supplying units that each transmit an electric wave on the basis of the reference signal, a reception power supplying unit that receives the electric wave and generates a reception signal on the basis of the received electric wave, a phase difference detector, a switching device that performs a switching operation for each of the transmission power supplying units connected to the signal processing circuit by the control of the phase difference detector, and a phase shifter that controls the phase of the reference signal on the basis of a phase shift amount fed from the phase difference detector. The reception power supplying unit generates each of the reception signals before and after the switching operation. The signal processing circuit obtains each of difference signals before and after the switching operation on the basis of the reception signal and the reference signal. The phase difference detector detects a transmission phase difference between the plurality of transmission power supplying units on the basis of the respective difference signals before and after the switching operation, and adjusts the phase shift amount on the basis of the transmission phase difference and a set phase difference.

Advantageous Effects of Invention

The effect obtained by the representative invention among the inventions disclosed herein will be briefly described as follows.

That is, according to the representative embodiment of the present invention, the radar sensor that can control the beam radiation direction at high accuracy can be provided.

DESCRIPTION OF EMBODIMENTS

Figure 1:
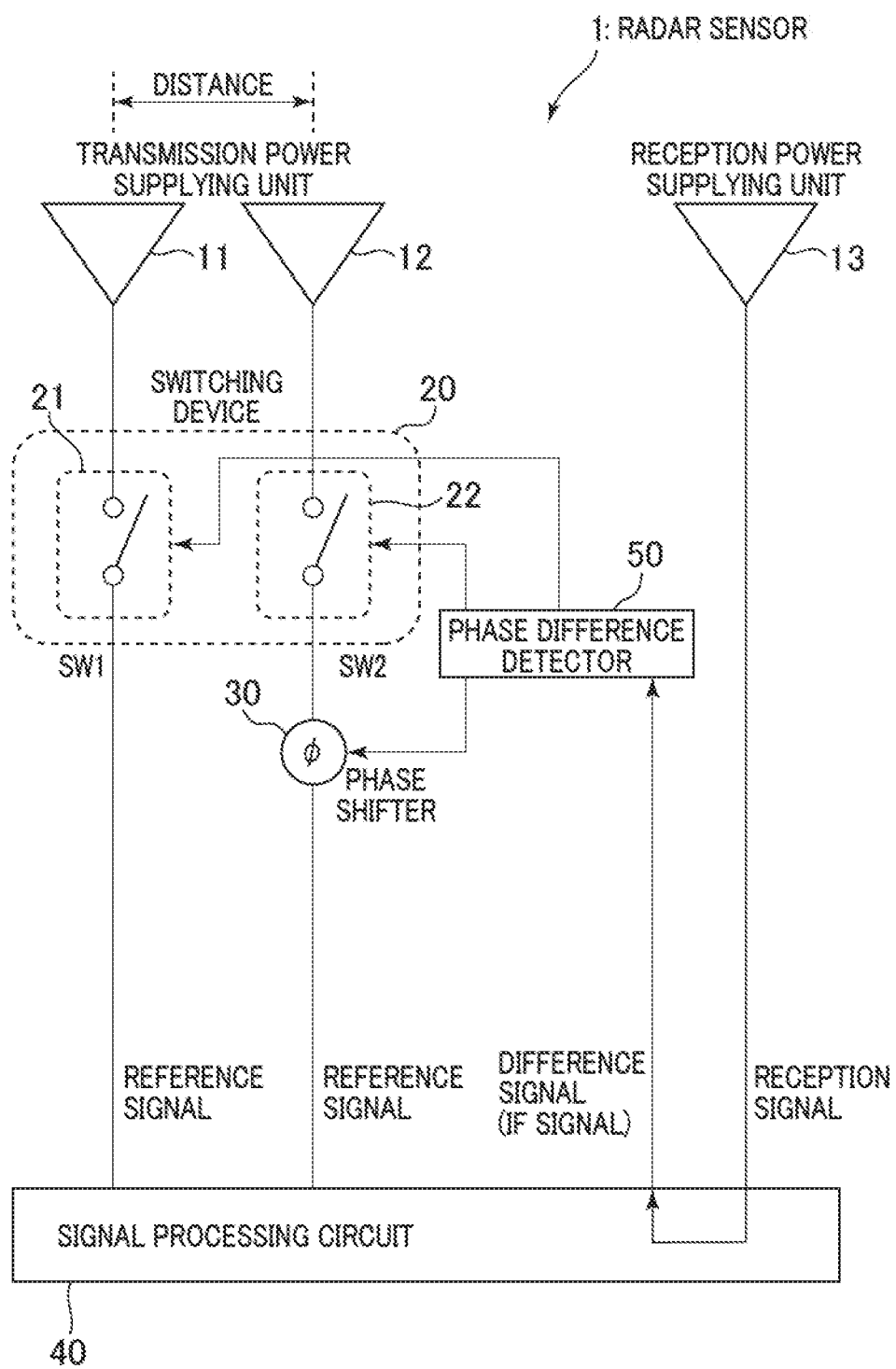
FIG. 1 is a circuit diagram illustrating an example of the configuration of a radar sensor according to a first embodiment of the present invention.

Best modes for embodying the present invention will be described below in detail with reference to the drawings. It should be noted that in the respective drawings for explaining the best modes for embodying the present invention, members having the same functions are indicated by similar reference numerals, and the repeated description thereof is omitted.

First Embodiment

The Configuration of a Radar Sensor

FIG. 1 is a circuit diagram illustrating an example of the configuration of a radar sensor according to a first embodiment of the present invention. For example, a radar sensor 1 is disposed in the front portion of a vehicle, and radiates a beam to perform the detection of a target in front of the vehicle and the like. Also, the radar sensor 1 may be installed in the rear portion of the vehicle.

As illustrated in FIG. 1, the radar sensor 1 includes a transmission power supplying unit (the other transmission power supplying unit) 11, a transmission power supplying unit (one transmission power supplying unit) 12, a reception power supplying unit 13, a switching device 20, a phase shifter 30, a signal processing circuit 40, and a phase difference detector 50. The switching device 20 includes a switching device (a second switching device) 21, and a switching device (a first switching device) 22. It should be noted that there is also the case where the switching device 21 is denoted as an SW1 and the switching device 22 is denoted as an SW2.

The transmission power supplying unit 11 is a transmission antenna that radiates a predetermined electric wave of a millimeter wave signal and the like on the basis of a reference signal fed from the signal processing circuit 40. On the other hand, the transmission power supplying unit 12 is a transmission antenna that radiates a predetermined electric wave of a millimeter wave signal and the like on the basis of a reference signal phase shifted by the phase shifter 30. The electric waves radiated from the transmission power supplying units 11 and 12 at the same time are spatially synthesized to become the beam radiated toward a predetermined direction on the basis of the phase difference between mutual antenna apertures (transmission phase difference).

The switching device 21 is a circuit that switches the connection state of the transmission power supplying unit 11 and the signal processing circuit 40, and the switching device 22 is a circuit that switches the connection state of the transmission power supplying unit 12 and the signal processing circuit 40. Each of the switching devices 21 and 22 includes a switch. Examples of the switch include, for example, an electric field effect transistor, such as a MOS-FET and a switching element, such as a relay circuit. The on and off of the switching devices 21 and 22 are controlled by the phase difference detector 50.

As illustrated in FIG. 1, the switching device 21 is provided between the transmission power supplying unit 11 and the signal processing circuit 40. When the switching device 21 is on, the transmission power supplying unit 11 is connected to the signal processing circuit 40. With this, the reference signal is fed to the transmission power supplying unit 11, and the transmission power supplying unit 11 radiates the predetermined electric wave on the basis of the reference signal.

On the other hand, the switching device 22 and the phase shifter 30 are provided between the transmission power supplying unit 12 and the signal processing circuit 40. It should be noted that the switching device 22 may be disposed between the transmission power supplying unit 12 and the phase shifter 30, as illustrated in FIG. 1, and may be provided between the phase shifter 30 and the signal processing circuit 40. When the switching device 22 is on, the transmission power supplying unit 12 is connected to the signal processing circuit 40. With this, the reference signal phase shifted by the phase shifter 30 is fed to the transmission power supplying unit 12, and the transmission power supplying unit 12 radiates the predetermined electric wave on the basis of the phase shifted reference signal. It should be noted that the phase shifter 30 will be described later.

The reception power supplying unit 13 is a reception antenna that receives the electric wave of the millimeter wave signal and the like. The reception power supplying unit 13 is connected to the signal processing circuit 40. The reception power supplying unit 13 generates a predetermined reception signal on the basis of the received electric wave, and feeds the generated reception signal to the signal processing circuit 40. It should be noted that the electric wave received by the reception power supplying unit 13 may be an incoming wave directly propagated from each of the transmission power supplying units 11 and 12, or may be a reflection wave from the target obtained by the radar scanning.

Each of the transmission power supplying units 11 and 12 and the reception power supplying unit 13 is, for example, a patch antenna, a horn antenna, and the like.

The phase shifter 30 is a circuit that shifts the phase of the reference signal. For example, the phase shifter 30 shifts the phase of the reference signal on the basis of a phase shift amount set by the phase difference detector 50. According to the phase shift amount set to the phase shifter 30, the transmission phase difference between the antenna apertures of the transmission power supplying units 11 and 12 is set. With this, the beam radiation direction is set.

The signal processing circuit 40 is a circuit that performs various signal processes. For example, the signal processing circuit 40 generates the millimeter wave signal as the reference signal for the electric wave radiation. Also, the signal processing circuit 40 amplifies the generated reference signal to a desired electric power, and feeds the amplified reference signal to each of the transmission power supplying units 11 and 12. Also, the signal processing circuit 40 performs the signal process on the basis of the reception signal fed from the reception power supplying unit 13. The detail of the signal process on the basis of the reception signal will be described later.

The phase difference detector 50 is a circuit that adjusts the beam radiation direction. For example, the phase difference detector 50 calculates the phase difference between the plurality of transmission power supplying units (the transmission phase difference), and adjusts the beam radiation direction on the basis of the transmission phase difference and the like.

It should be noted that three or more transmission power supplying units may be provided. Also, the phase shifter may be provided to each of the transmission power supplying units, and the phase of the reference signal may be controlled for each of the transmission power supplying units.

A Beam Radiation Direction Adjusting Method

Next, a beam radiation direction adjusting method will be described. In this embodiment, the transmission phase difference between the transmission power supplying units 11 and 12 is calculated on the basis of phase information of respective paths via the transmission power supplying units 11 and 12. And, the adjustment of the transmission phase difference is performed on the basis of the transmission phase difference and a set phase difference that is previously set, so that the adjustment of the beam radiation direction is performed.

Figure 2:
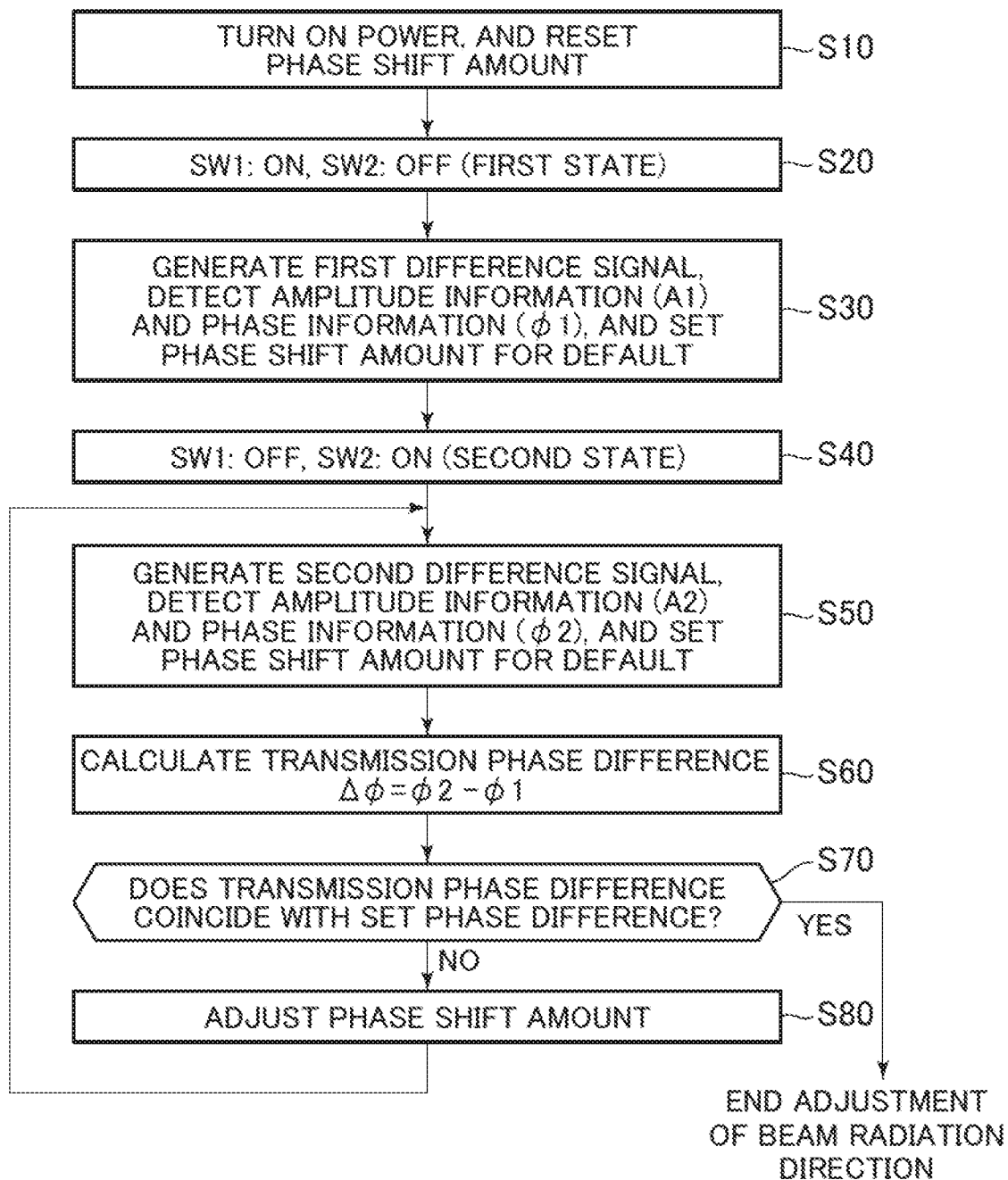
FIG. 2 is a flowchart illustrating an example of a beam radiation direction adjusting method according to the first embodiment of the present invention.

FIG. 2 is a flowchart illustrating an example of the beam radiation direction adjusting method according to the first embodiment of the present invention. From steps S10 to S80 illustrated in FIG. 2, the adjustment of the beam radiation direction is performed.

Step S10

Step S10 is a step of starting the radar sensor 1. When the power supply is turned on, the radar sensor 1 is started, and the phase difference detector 50 resets the phase shift amount set to the phase shifter 30 at the completion of the previous operation.

Step S20

Step S20 is a step of radiating the electric wave from the transmission power supplying unit 11. The phase difference detector 50 turns on the switching device 21, and turns off the switching device 22 (a first state). With this, the transmission power supplying unit 11 is connected to the signal processing circuit 40. With this, the reference signal is fed to the transmission power supplying unit 11, and the transmission power supplying unit 11 radiates the electric wave on the basis of the reference signal.

The reception power supplying unit 13 receives the incoming wave of the electric wave radiated from the transmission power supplying unit 11 or the reflection wave from the target, and generates the reception signal before the switching operation (a first reception signal) on the basis of the received electric wave. The reception power supplying unit 13 feeds the generated reception signal to the signal processing circuit 40.

Step S30

Step S30 is a step of detecting the phase information (first phase information: $\phi1$) of the path via the transmission power supplying unit 11 (a first path). The signal processing circuit 40 generates the difference signal before the switching operation (a first difference signal) on the basis of the reception signal before the switching operation (the first reception signal) fed from the reception power supplying unit 13 and the reference signal. The difference signal is a signal defined by the difference between the reception signal and the reference signal. The difference signal generated here includes the phase information of the entire path including the switching device 20 (the switching device 21), the wiring, and the transmission power supplying unit 11.

And, the signal processing circuit 40 converts the generated difference signal to a predetermined intermediate frequency signal (an IF signal). It should be noted that hereinafter, the difference signal converted to the intermediate frequency signal is sometimes called a converted difference signal. And, the signal processing circuit 40 feeds the converted difference signal to the phase difference detector 50.

The phase difference detector 50 detects, from the converted difference signal, amplitude information (A1) and the phase information ($\phi1$) of the converted difference signal. The detected phase information ($\phi1$) is phase information of the path via the transmission power supplying unit 11. Also, the amplitude information (A1) represents the intensity of the received electric wave. The phase difference detector 50 feeds, as the phase shift amount for the default, the detected phase information ($\phi1$) to the phase shifter 30. Also, the phase difference detector 50 may buffer the detected amplitude information (A1) and the detected phase information ($\phi1$), or may be stored in a storage device.

Step S40

Step S40 is a step of radiating the electric wave from the transmission power supplying unit 12. The phase difference detector 50 turns off the switching device 21, turns on the switching device 22 (a second state), and performs the switching operation for the connection state. Then, the transmission power supplying unit 11 is electrically disconnected from the signal processing circuit 40. With this, the reference signal phase shifted by the phase shifter 30 on the basis of the phase shift amount for the default is fed to the transmission power supplying unit 12. And, the transmission power supplying unit 12 radiates the electric wave on the basis of the phase shifted reference signal.

The reception power supplying unit 13 receives the incoming wave of the electric wave radiated from the transmission power supplying unit 12 or the reflection wave from the target, and generates the reception signal after the switching operation (a second reception signal) on the basis of the received electric wave. The reception power supplying unit 13 feeds the generated reception signal to the signal processing circuit 40.

Step S50

Step S50 is a step of detecting the phase information (second phase information) of the path via the transmission power supplying unit 12 (a second path). The signal processing circuit 40 generates the difference signal after the switching operation (a second difference signal) on the basis of the reception signal after the switching operation fed from the reception power supplying unit (a second reception signal) and the reference signal. The difference signal generated here includes the phase information of the entire path including the switching device 20 (the switching device 22), the wiring, and the transmission power supplying unit 12.

And, the signal processing circuit 40 converts the generated difference signal to the predetermined intermediate frequency signal. And, the signal processing circuit 40 feeds the converted difference signal to the phase difference detector 50.

The phase difference detector 50 detects, from the converted difference signal, amplitude information (A2) and the phase information ($\phi2$) of the converted difference signal. The detected phase information ($\phi2$) is phase information of the path via the transmission power supplying unit 12. Also, the detected amplitude information (A2) is information that represents the intensity of the received electric wave. The phase difference detector 50 may buffer the detected phase information ($\phi2$), or may be stored in the storage device.

Step S60

Step S60 is a step of calculating the phase difference between the antenna aperture surfaces of the transmission power supplying units 11 and 12 (the transmission phase difference). The phase difference detector 50 calculates, as the transmission phase difference ($\Delta\phi$), the difference ($\phi2-\phi1$) between the phase information after the switching operation (the second phase information: $\phi2$) and the phase information $\phi1$ before the switching operation.

The respective phase information ($\phi1$, $\phi2$) are detected on the basis of the electric wave received by the shared reception power supplying unit 13, so that the phase difference between the paths ($\phi2-\phi1$) is based on the phase difference between the antenna aperture surfaces. Thus, the phase difference detector 50 calculates the phase difference ($\phi2-\phi1$), and then calculates the transmission phase difference ($\Delta\phi$) between the antenna aperture surfaces.

It should be noted that according to the disposition of the transmission power supplying units 11 and 12, the distance from the transmission power supplying unit 11 to the reception power supplying unit 13 and the distance from the transmission power supplying unit 12 to the reception power supplying unit 13 are different. For this, the phase difference detector 50 may correct the transmission phase difference $\Delta\phi$ according to the difference between the distance from the transmission power supplying unit 11 to the reception power supplying unit 13 and the distance from the transmission power supplying unit 12 to the reception power supplying unit 13.

Step S70

Step S70 is a step of determining whether the beam radiation direction coincides with the previously set predetermined radiation direction. The phase difference detector 50 compares the transmission phase difference calculated in step S60 and the set phase difference. It should be noted that the set phase difference is referred to as the phase difference between the transmission power supplying units (between the antenna apertures of the transmission power supplying units 11 and 12) when the beam is radiated in the set direction.

When the transmission phase difference coincides with the set phase difference (Yes), the phase difference detector 50 determines that the beam radiation direction coincides with the previously set direction, and the adjustment of the beam radiation direction is ended. After that, for example, both of the switching devices 21 and 22 are turned on, and the beam is radiated in the adjusted direction (the set direction).

On the other hand, when the transmission phase difference is different from the set phase difference (No), the phase difference detector 50 determines that the beam radiation direction is different from the set direction. In this case, in step S80 described later, the adjustment of the beam radiation direction is performed.

It should be noted that when the transmission phase difference falls within the predetermined allowed range including the set phase difference, the phase difference detector 50 may determine that these phase differences coincide with each other. It should be noted that, for example, the allowed range may be defined in the range that can detect the reflection wave from the target on the basis of the information, such as the amplitude information (A1, A2). In this way, by allowing the error of the transmission phase difference, the time for adjusting the radar radiation direction is shortened.

Step S80

Step S80 is a step of performing the adjustment of the beam radiation direction on the basis of the transmission phase difference and the set phase difference. For example, the phase difference detector 50 calculates the difference between the transmission phase difference and the set phase difference, and increments or decrements the phase shift amount according to the calculated difference value. The phase difference detector 50 feeds the adjusted phase shift amount to the phase shifter 30, and the information of the phase shift amount in the phase shifter 30 is updated.

With this, the reference signal phase shifted on the basis of the adjusted phase shift amount is fed to the transmission power supplying unit 12, and the transmission power supplying unit 12 radiates the electric wave on the basis of the reference signal after the adjustment of the phase shift amount.

Processes after the Adjustment of the Beam Radiation Direction is Performed

When the process in step S80 is performed, the processes in steps S50 to S70 that have already been described are performed again. In step S50 performed again, amplitude information (A2') and phase information ($\phi 2'$) of the path via the transmission power supplying unit 12 are detected again on the basis of the reference signal and the reception signal generated on the basis of the electric wave received after the adjustment of the direction.

In step S60 performed again, the transmission phase difference after the adjustment of the direction ($\Delta\phi'=\phi 2'-\phi 1$) is calculated, and in step S70 performed again, the comparison of the transmission phase difference after the adjustment of the direction ($\Delta\phi'$) and the set phase difference is performed.

When the transmission phase difference after the adjustment of the beam radiation direction ($\Delta\phi'$) and the set phase difference coincide with each other, the adjustment of the beam radiation direction is ended, but when these phase differences do not coincide with each other, the re-adjustment of the beam radiation direction is performed by the process in step S80. In this way, until the transmission phase difference and the set phase difference coincide with each other, the adjustment of the beam radiation direction is repeatedly performed.

It should be noted that the case where the processes insteps S50 to S80 are repeated to perform the adjustment of the beam radiation direction has been described here, but the adjustment may be performed by a method other than this. For example, in step S50, the switching device 22 may be turned off after the electric wave radiated from the transmission power supplying unit 12 is received. In this case, the routine returns to step S40, and the adjustment of the beam radiation direction is performed. Also, the processes in steps S20 to S80 may be repeated to perform the adjustment of the beam radiation direction.

Also, after the adjustment of the beam radiation direction is ended, the re-adjustment may further be performed for the tracking to the target and the like. In that case, the phase difference detector 50 may execute the processes in steps S20 to S80 again, or may execute only steps S40 to S80 again. When the processes are executed again from step S20, for example, the environment change, such as temperature change, in the path via the transmission power supplying unit 11 after the start of the radar sensor 1 can be reflected, and the adjustment of the beam radiation direction can thus be correctly performed. Also, when the processes only in steps S40 to S80 are performed, the processes related to the re-adjustment of the beam radiation direction are shortened, so that the re-adjustment for a short time is enabled.

Main Effect According to this Embodiment

According to this embodiment, the transmission phase difference between the antenna apertures of the transmission power supplying units 11 and 12 can be calculated on the basis of the respective difference signals before and after the switching operation by the switching device 20, so that the beam radiation direction can be controlled at high accuracy.

Figure 3:
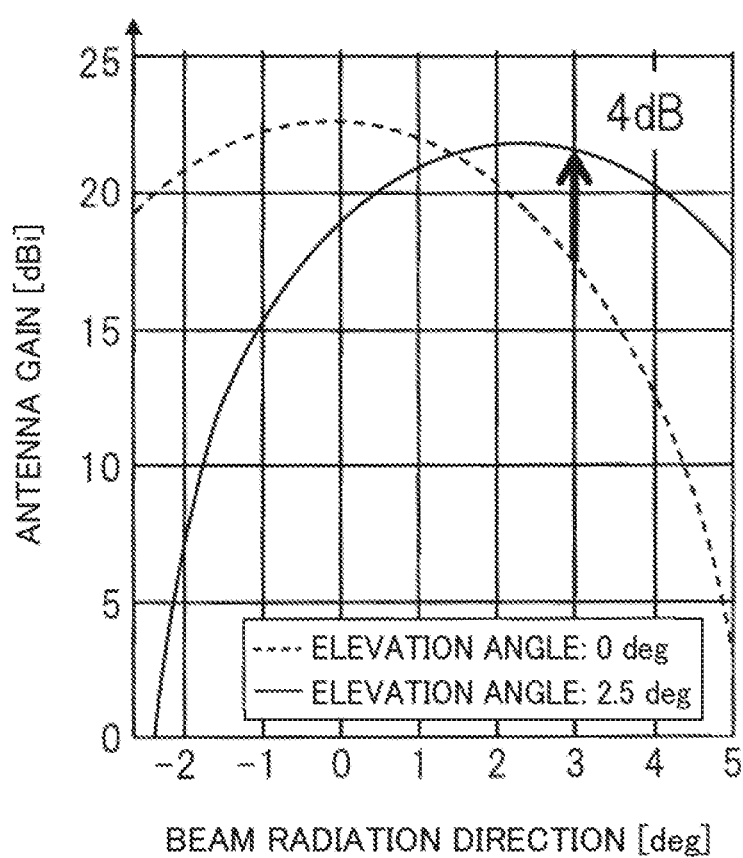
FIG. 3 is a graph explaining the effect according to this embodiment.

FIG. 3 is a diagram explaining the effect according to this embodiment. FIG. 3 illustrates the gain before the adjustment of the beam radiation direction and the antenna gain after the adjustment of the beam radiation direction. The horizontal axis in FIG. 3 represents the direction [deg] with respect to the traveling direction of the vehicle. The positive side of the horizontal axis represents the right side with respect to the traveling direction (0 [deg]), and the negative side of the horizontal axis represents the left side with respect to the traveling direction. The vertical axis in FIG. 3 represents the antenna gain [dBi]. The dashed line represents the antenna gain before the adjustment of the beam radiation direction (elevation angle 0 deg). The solid line represents the antenna gain after the adjustment of the beam radiation direction (elevation angle 2.5 deg).

For example, the antenna gain in the beam radiation direction=3 [deg] will be studied. The antenna gain before the adjustment of the beam radiation direction is approximately 17 to 18 [dBi], but the antenna gain after the adjustment of the beam radiation direction is approximately 21 to 22 [dBi]. In this way, by adjusting the beam radiation direction so that it is directed toward the target, the antenna gain is improved by approximately 4 [dBi].

Also, according to this embodiment, the transmission phase difference is calculated on the basis of the phase information ($\phi 1$, $\phi 2$) of the respective paths via the transmission power supplying units 11 and 12. According to this configuration, the phase information ($\phi 1$, $\phi 2$) of the respective paths can be grasped, so that the transmission phase difference can be precisely adjusted.

Also, according to this embodiment, before the first state is changed to the second state, the phase difference detector 50 feeds, as the phase shift amount for the default, the phase information ($\phi$1) to the phase shifter 30. According to this configuration, the phase information ($\phi$1) of the path via the transmission power supplying unit 11 is reflected, and then, the phase information ($\phi$2) of the path via the transmission power supplying unit 12 can be detected. With this, the difference between the transmission phase difference calculated first and the set phase difference can be smaller, so that the adjustment of the beam radiation direction is easily performed.

Also, according to this embodiment, the signal processing circuit 40 converts the difference signal to the predetermined intermediate frequency signal, and the phase difference detector detects, from the converted difference signal, the phase information ($\phi$1, $\phi$2) of the respective paths. According to this configuration, the signal process can be performed while the attenuation of the signal is prevented. Thus, the detection accuracy of the amplitude information and the phase information can be secured.

Also, according to this embodiment, the phase difference detector 50 corrects the transmission phase difference according to the difference between the distance from the transmission power supplying unit 11 to the reception power supplying unit 13 and the distance from the transmission power supplying unit 12 to the reception power supplying unit 13 or the distance between the transmission power supplying units 11 and 12. According to this configuration, the transmission phase difference is calculated more precisely, so that the adjustment of the beam radiation direction can be performed more precisely.

Second Embodiment

Next, a second embodiment will be described. In the second embodiment, the transmission phase difference between the antenna aperture surfaces is detected on the basis of a wave equation corresponding to before the switching operation for the connection state and a wave equation corresponding to after the switching operation for the connection state, and the adjustment of the beam radiation direction is performed. It should be noted that hereinafter, in principle, the description of the portions overlapped with the above embodiment is omitted.

The Configuration of a Radar Sensor

Figure 4:
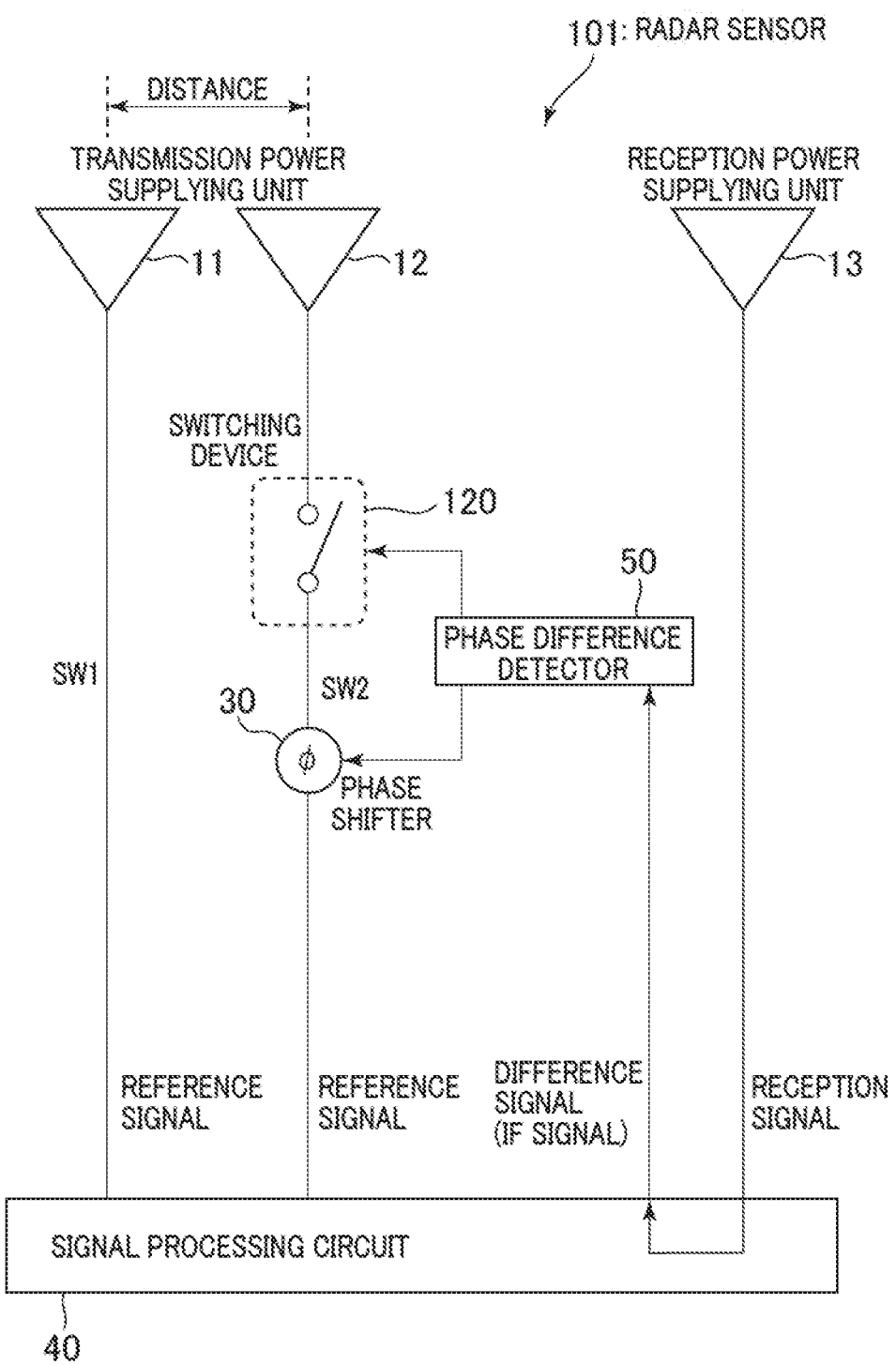
FIG. 4 is a circuit diagram illustrating an example of the configuration of a radar sensor according to a second embodiment of the present invention.

FIG. 4 is a circuit diagram illustrating an example of the configuration of a radar sensor according to the second embodiment of the present invention. As illustrated in FIG. 4, in a radar sensor 101, the switching device 20 in FIG. 1 is replaced with a switching device 120. The switching device 120 is provided between the transmission power supplying unit 12 and the signal processing circuit 40. The switching device 120 has the same configuration as the switching devices 21 and 22 illustrated in FIG. 1. It should be noted that the switching device 120 can be denoted as the SW2.

On the other hand, the transmission power supplying unit 11 is connected to the signal processing circuit 40, not via the switching device 120. Thus, during the operation of the radar sensor 101, the reference signal is fed to the transmission power supplying unit 11 at all times.

A Beam Radiation Direction Adjusting Method

Figure 5:
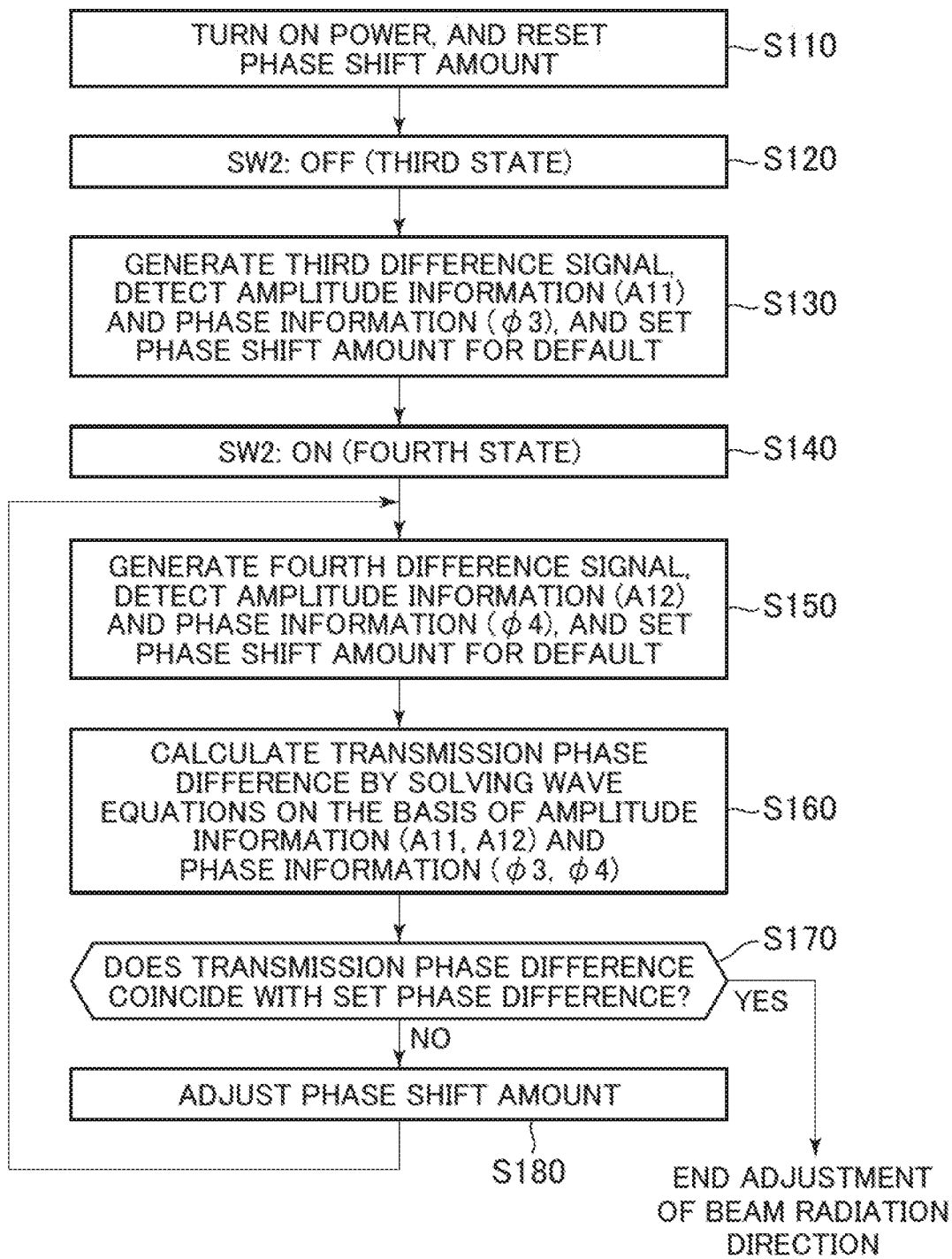
FIG. 5 is a flowchart illustrating an example of a beam radiation direction adjusting method according to the second embodiment of the present invention.

Next, a beam radiation direction adjusting method according to this embodiment will be described. FIG. 5 is a flowchart illustrating an example of the beam radiation direction adjusting method according to the second embodiment of the present invention. The adjustment of the beam radiation direction is performed in steps S110 to S180 in FIG. 5.

Step S110

Step S110 is a step of starting the radar sensor 101. In step S110, the same process as step S10 in FIG. 2 that has already been described is performed.

Step S120

Step S120 is a step of radiating the electric wave from the transmission power supplying unit 11. The phase difference detector 50 turns off the switching device 120 (a third state). With this, the reference signal is fed only to the transmission power supplying unit 11, and the transmission power supplying unit 11 radiates the electric wave on the basis of the reference signal.

Step S130

Step S130 is a step of detecting amplitude information (first amplitude information: A11) and phase information (third phase information: $\phi$3) of the path via the transmission power supplying unit 11 (a third path). The signal processing circuit 40 generates the difference signal before the switching operation (a third difference signal) on the basis of the reception signal before the switching operation (a third reception signal) fed from the reception power supplying unit 13 and the reference signal. The difference signal generated here includes the phase information of the entire path including the wiring and the transmission power supplying unit 11.

And, the signal processing circuit 40 converts the generated difference signal to the predetermined intermediate frequency signal, and feeds the converted difference signal to the phase difference detector 50.

The phase difference detector 50 detects, from the converted difference signal, the amplitude information (A11) and the phase information ($\phi$3) of the converted difference signal. The detected phase information ($\phi$3) is phase information of the path via the transmission power supplying unit 11. The phase difference detector 50 feeds, as the phase shift amount for the default, the detected phase information ($\phi$3) to the phase shifter 30. Also, the phase difference detector 50 may buffer the detected amplitude information (A11) and the detected phase information ($\phi$3), or may store them in the storage device. Other processes are the same as step S30 that has already been described.

Step S140

Step S140 is a step of radiating the electric waves from the transmission power supplying units 11 and 12. The phase difference detector 50 turns on the switching device 120 (a fourth state), and performs the switching operation for the connection state. With this, the reference signal phase shifted by the phase shifter 30 on the basis of the phase shift amount for the default is fed to the transmission power supplying unit 12. And, the transmission power supplying unit 12 radiates the electric wave on the basis of the phase shifted reference signal. Also, the transmission power supplying unit 11 radiates the electric wave on the basis of the reference signal. The electric waves radiated from the transmission power supplying units 11 and 12 are spatially synthesized.

The reception power supplying unit 13 receives the incoming wave of the spatially synthesized electric wave or the reflection wave from the target, and generates the reception signal after the switching operation (a fourth reception signal) on the basis of the received electric wave.

The reception power supplying unit 13 feeds the generated reception signal to the signal processing circuit 40.

Step S150

Step S150 is a step of detecting the amplitude information (second amplitude information: A12) and the phase information (fourth phase information: $\phi 4$) of the path in which the path via the transmission power supplying unit 11 (the third path) and the path via the transmission power supplying unit 12 (a fourth path) are combined (a fifth path).

The signal processing circuit 40 generates the difference signal after the switching operation (a fourth difference signal) on the basis of the reception signal after the switching operation (the fourth reception signal) fed from the reception power supplying unit 13 and the reference signal. The difference signal generated here includes the phase information of the entire path including the switching device 120, the wiring, and the transmission power supplying units 11 and 12.

And, the signal processing circuit 40 converts the generated difference signal to the predetermined intermediate frequency signal (the IF signal), and feeds the converted difference signal to the phase difference detector 50.

The phase difference detector 50 detects, from the converted difference signal, the amplitude information (A12) and the phase information ($\phi 4$) of the converted difference signal. The detected phase information ($\phi 4$) is phase information of the path in which the path via the transmission power supplying unit 11 and the path via the transmission power supplying unit 12 are combined. The detected amplitude information (A12) and the detected phase information ($\phi 4$) may be buffered, or may be stored in the storage device. Other processes are the same as step S50 that has already been described.

Step S160

Step S160 is a step of calculating the phase difference between the antenna aperture surfaces of the transmission power supplying units 11 and 12.

For example, the phase difference detector 50 calculates the transmission phase difference by simultaneously setting up and solving the wave equation corresponding to the combination of the path via the transmission power supplying unit 11, the amplitude information (A11), and the phase information ($\phi 3$) (a first wave equation) and the wave equation (the second wave equation) corresponding to the combination of the path in which the path via the transmission power supplying unit 11 and the path via the transmission power supplying unit 12 are combined (the fifth path), the amplitude information (A12), and the phase information ($\phi 4$).

When the simultaneous wave equation obtained by simultaneously setting up these wave equations is solved, the transmission phase difference ($\Delta \phi$) between the antenna apertures of the transmission power supplying units 11 and 12 is obtained as one solution. In this way, in this embodiment, the transmission phase difference ($\Delta \phi$) is directly calculated from the simultaneous wave equation.

It should be noted that the case where the number of transmission power supplying units is two has been described here, but the number of transmission power supplying units may be three or more. In this case, the phase difference detector 50 can detect the phase difference between the respective antenna apertures by simultaneously setting up three or more wave equations.

Steps S170 and S180

Steps S170 and S180 are the same steps S70 and S80 in FIG. 2 that have already been described, and the description thereof is thus omitted.

Main Effect According to this Embodiment

According to this embodiment, the following effect is obtained in addition to the effect according to the above embodiment. According to this embodiment, the switching device is provided only between the transmission power supplying unit 12 and the signal processing unit 40. According to this configuration, the amplitude information and the phase information of the electric waves radiated from the respective transmission power supplying units 11 and 12 and spatially synthesized are obtained, so that the transmission phase difference ($\Delta \phi$) can be calculated without obtaining the information of the respective paths via the transmission power supplying units 11 and 12.

Third Embodiment

Next, a third embodiment will be described. In this embodiment, a method for tracking the target while adjusting the beam radiation direction on the basis of a radar reflection cross section area (RCS: Radar Cross Section) will be described.

Figure 6:
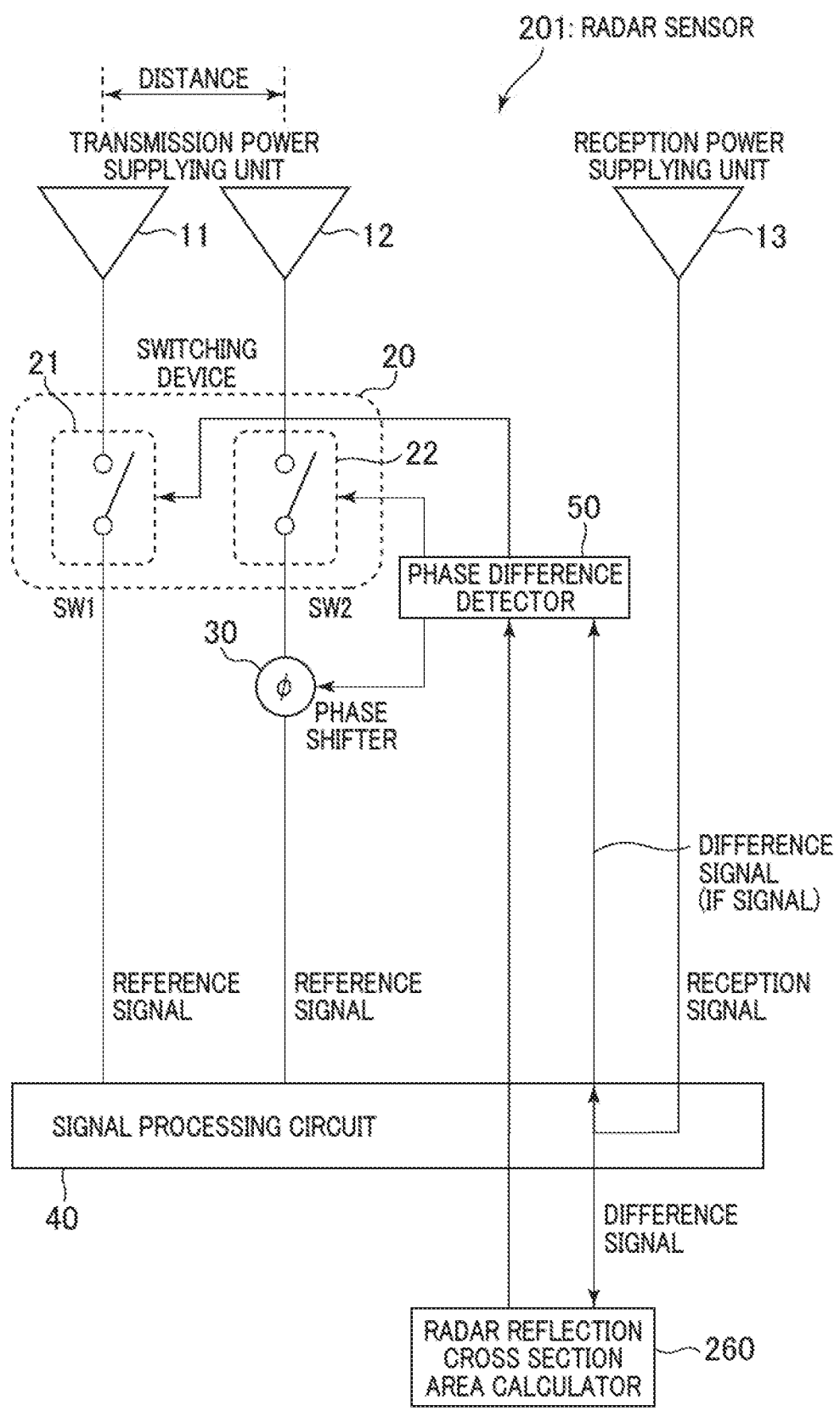
FIG. 6 is a circuit diagram illustrating an example of the configuration of a radar sensor according to a third embodiment of the present invention.

FIG. 6 is a circuit diagram illustrating an example of the configuration of a radar sensor according to the third embodiment of the present invention. As illustrated in FIG. 6, a radar sensor 201 is configured such that a radar reflection cross section area calculator 260 is added to the radar sensor 1 illustrated in FIG. 1.

The radar reflection cross section area calculator 260 is a device that calculates the radar reflection cross section area of the target. For example, the radar reflection cross section area calculator 260 calculates the radar reflection cross section area of the target on the basis of a later-described target detection difference signal (the difference signal) fed from the signal processing circuit 40, and feeds the calculated radar reflection cross section area to the phase difference detector 50.

A Beam Radiation Direction Adjusting Method

Figure 7:
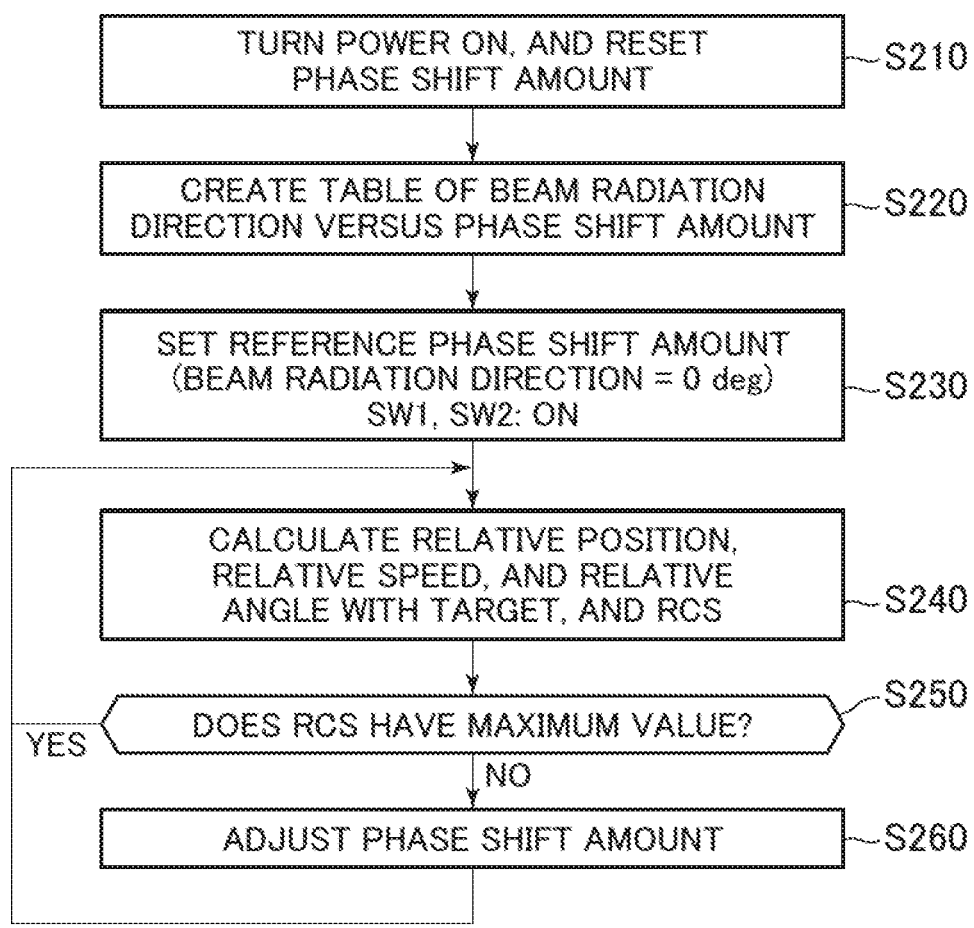
FIG. 7 is a flowchart illustrating an example of a beam radiation direction adjusting method according to the third embodiment of the present invention.

Next, a beam radiation direction adjusting method according to this embodiment will be described. FIG. 7 is a flowchart illustrating an example of the beam radiation direction adjusting method according to the third embodiment of the present invention. The adjustment of the beam radiation direction is performed in steps S210 to S260 in FIG. 7.

Step S210

Step S210 is a step of starting the radar sensor 201. In step S210, the same process as step S10 in FIG. 2 and step S110 in FIG. 5 that have already been described is performed.

Step S220

Step S220 is a step of creating a table in which the phase shift amounts and the transmission phase differences are corresponded to each other. The phase difference detector 50 calculates the transmission phase differences at the respective phase shift amounts while switching the phase shift amounts set to the phase shifter 30. And, the phase difference detector 50 creates the table in which the phase shift amounts and the transmission phase differences are corresponded to each other. It should be noted that the method for calculating the transmission phase difference is the same as the first embodiment, and the description thereof is thus omitted here.

Step S230

Step S230 is a step of setting, to the phase shifter 30, the phase shift amount when the transmission phase difference is zero. The phase difference detector 50 extracts, on the basis of the created table, the phase shift amount when the transmission phase difference is zero, and sets, as the reference phase shift amount, the extracted phase shift amount to the phase shifter 30.

And, the phase difference detector 50 turns on the switching devices 21 and 22. With this, the electric waves radiated from the transmission power supplying units 11 and 12 are spatially synthesized to radiate the beam to the traveling direction of the vehicle (0 deg).

Step S240

Step S240 is a step of calculating the relative distance, the relative speed, and the relative angle with the target and the radar reflection cross section area.

The electric waves radiated from the transmission power supplying units 11 and 12 are reflected on the target, and the reception power supplying unit 13 receives the reflection wave from the target. The reception power supplying unit 13 generates, as the reception signal, a target detection reception signal when the reference phase shift amount is set to the phase shifter 30, on the basis of the received reflection wave, and feeds the generated target detection reception signal to the signal processing circuit 40.

The signal processing circuit 40 generates, as the difference signal, the target detection difference signal on the basis of the target detection reception signal and the reference signal. And, the signal processing circuit 40 feeds the generated target detection difference signal to each of the radar reflection cross section area calculator 260 and the phase deference detector 50.

The radar reflection cross section area calculator 260 calculates the radar reflection cross section area on the basis of the target detection difference signal fed from the signal processing circuit 40. And, the radar reflection cross section area calculator 260 feeds the calculated radar reflection cross section area to the phase difference detector 50.

On the other hand, the phase difference detector 50 calculates the relative distance, the relative speed, and the relative angle with the target on the basis of the target detection difference signal fed from the signal processing circuit 40. The calculation of the radar reflection cross section area by the radar reflection cross section area calculator 260 and the calculation of the relative distance, the relative speed, and the relative angle by the phase difference detector 50 may be performed in parallel.

It should be noted that the signal processing circuit 40 may convert the target detection difference signal to the predetermined intermediate frequency signal (the IF signal), and feed the converted target detection difference signal to each of the radar reflection cross section area calculator 260 and the phase difference detector 50. In this case, the radar reflection cross section area calculator 260 calculates the radar reflection cross section area on the basis of the converted target detection difference signal. Also, the phase difference detector 50 calculates the relative distance, the relative angle, and the relative speed with the target on the basis of the converted target detection difference signal.

The calculated relative distance, relative speed, relative angle, and radar reflection cross section area may be, for example, buffered in the phase difference detector 50, or may be stored in the storage device, not illustrated.

Steps S250 and S260

Steps S250 and S260 are steps of adjusting the beam radiation direction according to the characteristic of the target so that the radar reflection cross section area has a maximum value. Specifically, step S250 is a step of determining whether the radar reflection cross section area calculated in step S240 has the maximum value. Also, step S260 is a step of adjusting the phase shift amount on the basis of the determination result in step S250.

Examples of the target include, for example, a low vehicle, such as a sports car, and a high vehicle, such as a large truck. Also, there is a vehicle in which the reflection wave is likely to be scattered, such as a tank truck. In this way, when the vehicle shape is different, there is the case where the optimal beam radiation direction is different for each vehicle.

When the beam radiation direction is not set to the optimal direction, the reflection intensity of the reflection wave from the target becomes weak, so that the signal SN ratio of the reflection wave received is insufficient. Consequently, there is a fear that the tracking to the target by the radar becomes difficult. Accordingly, in this embodiment, in steps S250 and S260, the beam radiation direction for each vehicle is adjusted to prevent the tracking from being unenabled. Steps S250 and S260 will be described below in detail.

Processes after the First Radar Reflection Cross Section Area Calculation

First, processes after the first radar reflection cross section area calculation will be described. In this case, since the radar reflection cross section area is calculated only once, there is no information of the radar reflection cross section area to be compared. For this, in step S250 for the first radar reflection cross section area calculation, the process for determining the radar reflection cross section area by the phase difference detector 50 is not performed, and the process in step S260 is performed.

In step S260, the phase difference detector 50 performs the adjustment of the phase shift amount. However, in step S260 for the first radar reflection cross section area calculation, the determination result in step S250 is not present, and thus, the determination reference for incrementing or decrementing the phase is not present. Accordingly, the phase difference detector 50 preferably previously defines whether the phase is incremented or decremented in step S260 for the first calculation. With this, the adjustment of the phase shift amount of the first calculation can be smoothly performed.

After the adjustment of the phase shift amount, the process in step S240 is executed again, and the relative distance, the relative speed, and the relative angle with the target and the radar reflection cross section area are calculated again.

Processes after the Second and Subsequent Radar Reflection Cross Section Area Calculations Next, processes after the second and subsequent radar reflection cross section area calculations will be described. In step S250 for each of the second and subsequent radar reflection cross section area calculations, the comparison of each presently calculated radar reflection cross section area and each previous radar reflection cross section area is performed. As a result, when the radar reflection cross section area calculated presently has the maximum value (Yes), the phase difference detector 50 does not perform the adjustment of the phase shift amount. And, the process in step S240 is performed again.

On the other hand, when the presently calculated radar reflection cross section area does not have the maximum value (No), the routine moves to step S260, and the phase difference detector 50 performs the adjustment of the phase shift amount. For example, when the present radar reflection cross section area is smaller than the previous radar reflection cross section area, the phase difference detector 50 may return the next phase shift amount to the value of approximately the previous phase shift amount. And, the process in step S240 is performed again. In this way, the phase difference detector 50 updates the target information at any time.

It should be noted that in step S250, the phase difference detector 50 may perform the determination process by using, as the comparison targets, a plurality of beam reflection cross section areas including the previous beam reflection cross section area calculated within the predetermined period, or may perform the determination process by using, as the comparison target, only the previous beam reflection cross section area. With this, the number of the comparison targets is smaller, the determination process is simplified, so that the processing time is shortened.

Also, the case where the radar reflection cross section area calculator 260 is provided in the radar sensor 1 in FIG. 1 has been described here, but it may be provided in the radar sensor 101 in FIG. 4.

Main Effect According to this Embodiment

According to this embodiment, the following effect is obtained in addition to the effects of the above respective embodiments. According to this embodiment, the beam radiation direction is adjusted so that the radar reflection cross section area of the target has the maximum value, and the reflection intensity of the reflection wave from the target can thus be prevented from being reduced. With this, the tracking to the target by the radar is enabled regardless of the shape of the target.

Fourth Embodiment

Next, a fourth embodiment will be described. When the vehicle is tilted due to the unbalanced weight, the radar sensor is also tilted. However, in the embodiments described so far, the tilt of the radar sensor itself cannot be detected. Accordingly, in this embodiment, a configuration that can detect the tilt of the radar sensor will be described.

Figure 8:
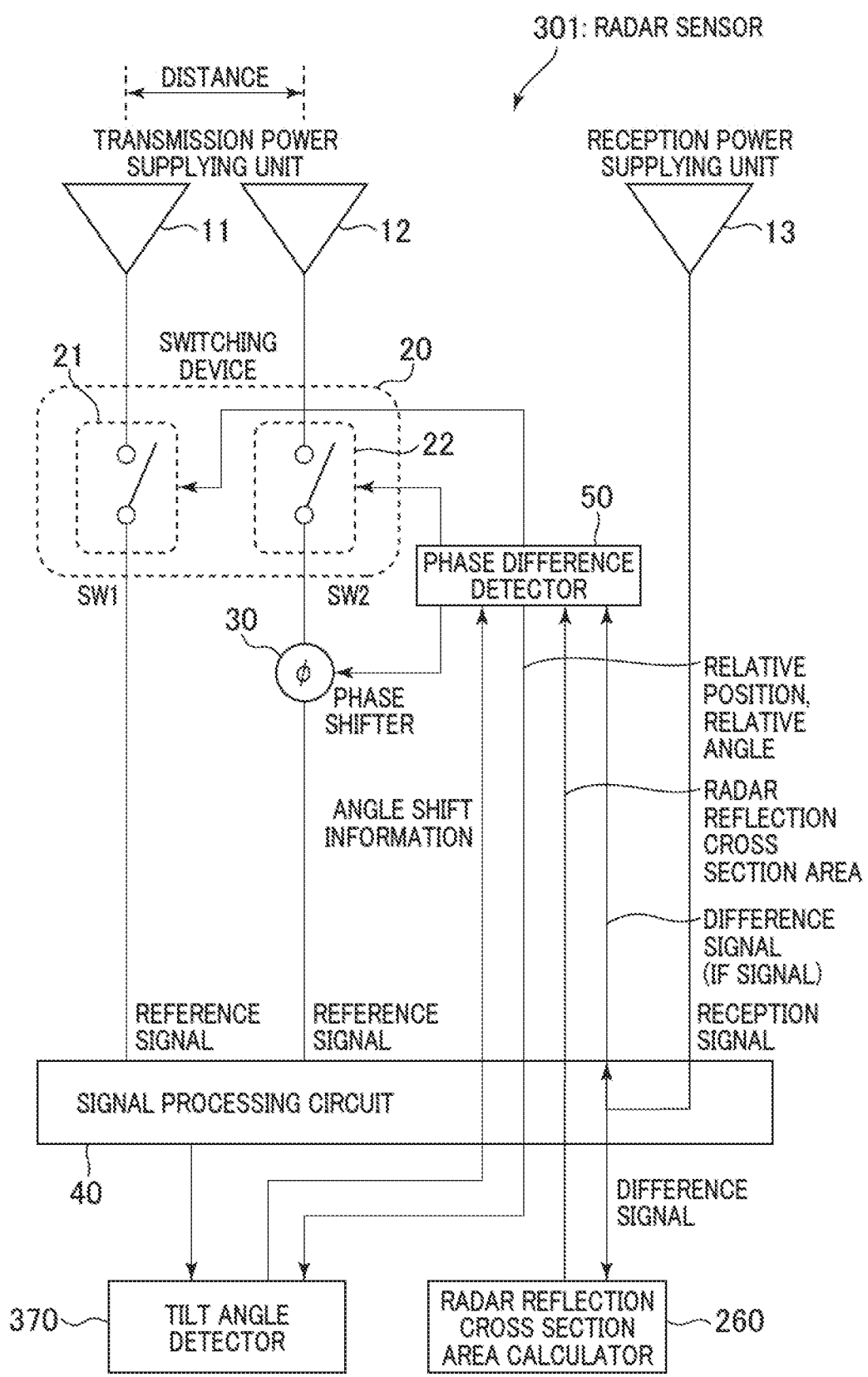
FIG. 8 is a circuit diagram illustrating an example of the configuration of a radar sensor according to a fourth embodiment of the present invention.

FIG. 8 is a circuit diagram illustrating an example of the configuration of a radar sensor according to the fourth embodiment of the present invention. As illustrated in FIG. 8, a radar sensor 301 is configured such that a tilt angle detector 370 is added to the radar sensor 201 illustrated in FIG. 6.

The phase difference detector 50 feeds, to the tilt angle detector 370, a plurality of relative distances calculated for the same target and the relative angles corresponding to the respective relative distances when the radar reflection cross section area is maximum. For example, the phase difference detector 50 may feed the relative distance with the target and the corresponding relative angle to the tilt angle detector 370 for each calculation. Alternatively, the phase difference detector 50 may feed the relative distances and the relative angles together to the tilt angle detector 370 during each predetermined period. In that case, the phase difference detector 50 may feed each of the relative distances and the corresponding relative angle to the tilt angle detector 370 together with additional information, such as the reception time of the electric wave and an identification number.

The tilt angle detector 370 is a device that detects the shift of the radar radiation direction. Specifically, the tilt angle detector 370 detects the angle shifts of the beam radiation direction on the basis of the plurality of relative distances with the target and the relative angles corresponding to the respective relative distances. For example, the tilt angle detector 370 compares the relative angles for the respective relative distances to estimate the relative angle when the device is not tilted, and compares the estimated relative angle and the calculated relative angle to detect the angle shift of the beam radiation direction. And, the tilt angle detector 370 detects the tilt of the radar sensor 301 on the basis of the detected angle shift.

By the way, when the beam radiation direction during the start of the tracking to the target is substantially the horizontal direction, the phase difference detector 50 should adjust the beam radiation direction in the left and right direction in the tracking after that. In this case, the tilt angle detector 370 can also detect the angle shift of the beam radiation direction and the tilt of the radar sensor 301 only on the basis of the calculated relative angle.

Also, the radar sensor 301 may feed, as vehicle tilt information, the tilt of the radar sensor 301 detected by the tilt angle detector 370, to the vehicle. The vehicle may automatically perform the adjustment of the optical axis leveling of the front light on the basis of the vehicle tilt information fed from the radar sensor 301.

Also, the tilt angle detector 370 may store the detected tilt information of the radar sensor 301 in the storage device, not illustrated, and the like. And, the tilt angle detector 370 may, in chronological order, compare the tilt information of the radar sensor 301 to monitor various states, such as the presence or absence of failure occurrence in the radar sensor 301.

It should be noted that the tilt angle detector 370 may be provided in the radar sensor 101 in FIG. 4 together with the radar reflection cross section area 260.

Main Effect According to this Embodiment

According to this embodiment, the following effect is obtained in addition to the effects of the above respective embodiments. According to this embodiment, the angle shift of the beam radiation direction is detected by the tilt angle detector 370, so that the tilt of the radar sensor 301 can be detected on the basis of the detected angle shift.

Also, according to this embodiment, the adjustment of the optical axis leveling of the front light is automatically performed on the basis of the vehicle tilt information fed from the radar sensor 301. According to this configuration, the optical axis of the front light is set to the appropriate direction, and the safety during the traveling of the vehicle is thus improved.

Also, according to this embodiment, by chronologically comparing the tilt information of the radar sensor 301, when the specific angle shift is continuously detected, the radar sensor 301 can notify the failure occurrence, such as damage, to the user, such as a driver. Also, in the same case, the radar sensor 301 can notify the re-adjustment of the installation angle of the device to the user.

Fifth Embodiment

Next, a fifth embodiment of the present invention will be described. In this embodiment, the configuration of the switching device is different from the embodiments described so far.

Figure 9:
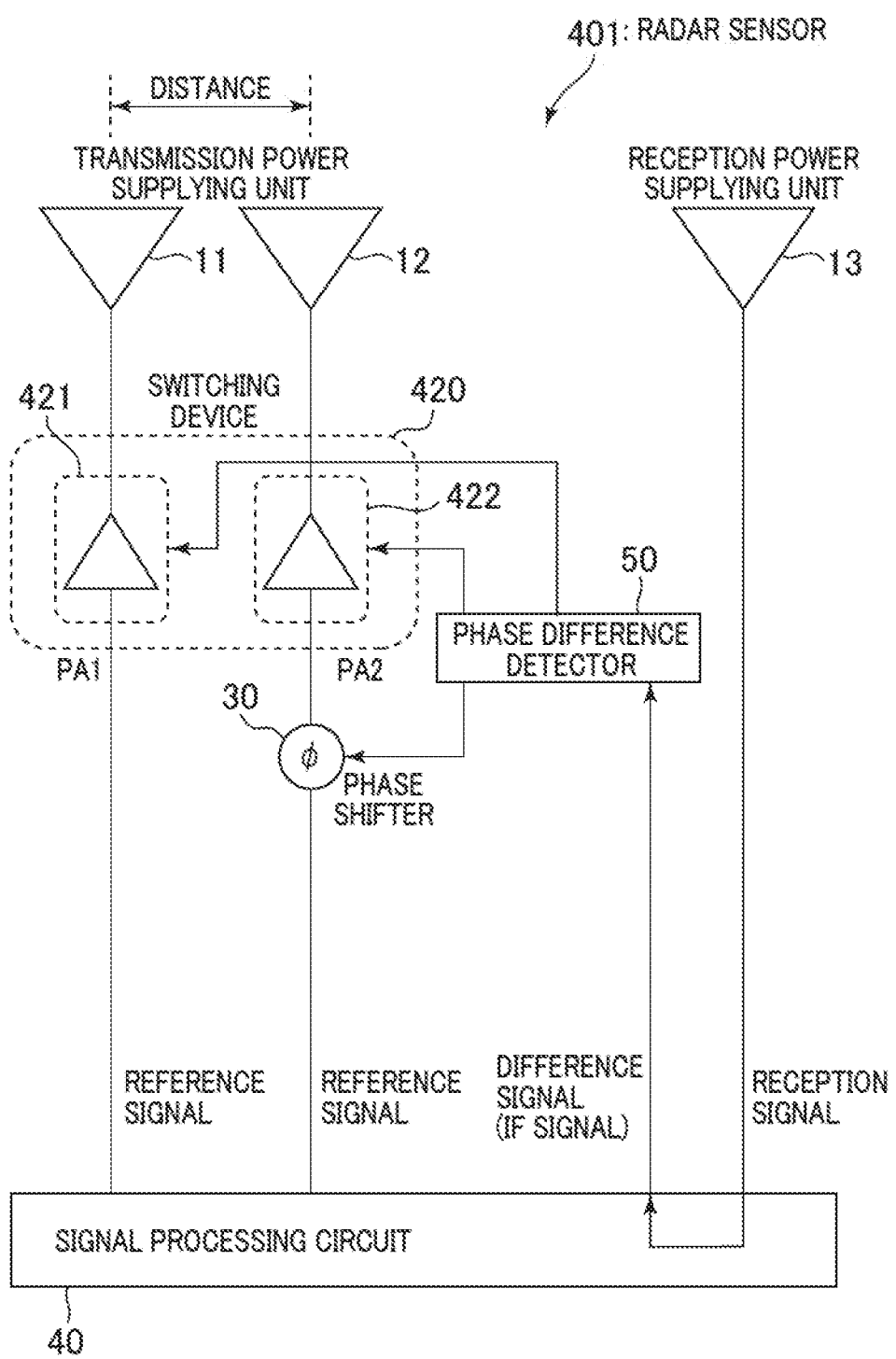
FIG. 9 is a circuit diagram illustrating an example of the configuration of a radar sensor according to a fifth embodiment of the present invention.

FIG. 9 is a circuit diagram illustrating an example of the configuration of a radar sensor according to the fifth embodiment of the present invention. A radar sensor 401 in FIG. 9 is configured such that the switching device 20 in FIG. 1 described in the first embodiment is replaced with a switching device 420. As illustrated in FIG. 9, the switching device 420 includes switching devices 421 and 422. Each of the switching devices 421 and 422 includes an electric power amplifier. The phase difference detector 50 switches the on and off of the switching devices 421 and 422, for example, by turning on and off the electric power amplifiers.

It should be noted that for each of the switching devices 421 and 422, the electric power amplifier having a large gain fluctuation width so that the amplitude ratio of the electric waves radiated from the transmission power supplying units 11 and 12 is less than the angle detection accuracy in the phase difference calculation may be used.

It should be noted that the configuration of the switching device described here is also applicable to the second to fourth embodiments. Even when the switching device is replaced from the switch to the electric power amplifier, the respective processes according to the respective embodiments described so far can be executed.

It should be noted that the present invention is not limited to the above embodiments, and includes various modifications. Also, the above embodiments have been described in detail for simply describing the present invention, and are not necessarily required to include all the described configurations.

Also, part of the configuration of one of the embodiments can be replaced with the configurations of other embodiments. Also, the configuration of the one embodiment can be added with the configurations of other embodiments. Also, part of the configuration of each of the embodiments can be subjected to addition, deletion, and replacement with respect to other configurations. It should be noted that the respective members and the relative sizes illustrated in the drawings are simplified and idealized for simply describing the present invention, and can have more complicated shapes from a mounting viewpoint.

LIST OF REFERENCE SIGNS

1, 101, 201, 301, 401 . . . radar sensor, 11, 12 . . . transmission power supplying unit, 13 . . . reception power supplying unit, 20, 21, 22, 122, 420, 421, 422 . . . switching device, 30 . . . phase shifter, 40 . . . signal processing circuit, 50 . . . phase difference detector, 260 . . . radar reflection cross section area calculator, 370 . . . tilt angle detector

The invention claimed is:

1. A radar sensor comprising:
a signal processing circuit that performs a signal process;
a plurality of transmission power supplying units that each radiate an electric wave on the basis of a reference signal fed from the signal processing circuit;
a reception power supplying unit that receives the electric wave and generates a reception signal on the basis of the received electric wave;
a switching device that switches a connection state of the signal processing circuit and each of the transmission power supplying units by a switching operation;
a phase difference detector that adjusts a phase shift amount of the reference signal; and
a phase shifter that is provided between the signal processing circuit and the transmission power supplying unit and shifts the phase of the reference signal on the basis of the phase shift amount,
wherein the reception power supplying unit generates each of the reception signals before and after the switching operation,
wherein the signal processing circuit generates each of difference signals before and after the switching operation on the basis of the reception signal and the reference signal,
wherein the phase difference detector calculates, as a transmission phase difference, the phase difference between the transmission power supplying units on the basis of the respective difference signals, and adjusts the phase shift amount on the basis of the transmission phase difference and a set phase difference that is previously set,
wherein the phase difference detector corrects the transmission phase difference according to the difference between the distances from the plurality of transmission power supplying units to the reception power supplying unit.

2. The radar sensor according to claim 1,
wherein the switching device has a first switching device and a second switching device,
wherein the phase shifter and the first switching device are provided between the one transmission power supplying unit and the signal processing circuit,
wherein the second switching device is provided between the other transmission power supplying unit and the signal processing circuit,
wherein in a first state where the first switching device is off and the second switching device is on, the reception power supplying unit receives the electric wave radiated from the other transmission power supplying unit, and generates a first reception signal before the switching operation, the signal processing circuit generates a first difference signal before the switching operation on the basis of the first reception signal and the reference signal, and the phase difference detector detects first phase information of a first path via the other transmission power supplying unit on the basis of the first difference signal,
wherein when the first state is switched to a second state where the first switching device is on and the second switching device is off, the reception power supplying unit receives the electric wave radiated from the one transmission power supplying unit, and generates a second reception signal after the switching operation, the signal processing circuit generates a second difference signal after the switching operation on the basis of the second reception signal and the reference signal, and the phase difference detector detects, on the basis of the second difference signal, second phase information of a second path via the one transmission power supplying unit, and calculates the transmission phase difference on the basis of the first phase information and the second phase information.

3. The radar sensor according to claim 2,
wherein before the first state is switched to the second state, the phase difference detector feeds, as the phase shift amount, the first phase information to the phase shifter.

4. The radar sensor according to claim 2,
wherein the signal processing circuit converts each of the first difference signal and the second difference signal to a predetermined intermediate frequency signal,
wherein the phase difference detector detects the first phase information from the converted first difference signal, and detects the second phase information from the converted second difference signal.

5. The radar sensor according to claim 1,
wherein the phase shifter and the switching device are provided between the one transmission power supplying unit and the signal processing circuit,
wherein the other transmission power supplying unit and the signal processing circuit are connected,
wherein in a third state where the switching device is off, the reception power supplying unit receives the electric wave radiated from the other transmission power supplying unit, and generates a third reception signal before the switching operation, the signal processing circuit generates a third difference signal before the switching operation on the basis of the third reception signal and the reference signal, and the phase difference detector detects first amplitude information and third phase information of a third path via the other transmission power supplying unit on the basis of the third difference signal, wherein the third state is switched to a fourth state where the switching device is on, the reception power supplying unit receives the electric waves radiated from the other transmission power supplying unit and the one transmission power supplying unit and spatially synthesized, and generates a fourth reception signal after the switching operation, the signal processing circuit generates a fourth difference signal after the switching operation on the basis of the fourth reception signal and the reference signal, and the phase difference detector detects, on the basis of the fourth difference signal, second amplitude information and fourth phase information of a fifth path in which the third path and a fourth path via the one transmission power supplying unit are combined, and calculates the transmission phase difference by simultaneously setting up and solving a first wave equation corresponding to the combination of the third path, the first amplitude information, and the third phase information and a second wave equation corresponding to the combination of the fifth path, the second amplitude information, and the fourth phase information.

6. The radar sensor according to claim 5, wherein before the third state is switched to the fourth state, the phase difference detector feeds, as the phase shift amount, the third phase information to the phase shifter.

7. The radar sensor according to claim 5, wherein the signal processing circuit converts each of the third difference signal and the fourth difference signal to the predetermined intermediate frequency signal, wherein the phase difference detector detects the first amplitude information and the third phase information from the converted third difference signal, and detects the second amplitude information and the fourth phase information from the converted fourth difference signal.

8. The radar sensor according to claim 1, wherein the radar sensor includes a radar reflection cross section area calculator that calculates the radar reflection cross section area of a target, wherein the phase difference detector calculates the transmission phase differences corresponding to the respective phase shift amounts while switching the phase shift amounts set to the phase shifter, creates a table in which the phase shift amounts and the transmission phase differences are corresponded to each other, and on the basis of the table, sets, as a reference phase shift amount, the phase shift amount when the transmission phase difference is zero, to the phase shifter, wherein the switching device connects the signal processing circuit and each of the plurality of transmission power supplying units, wherein the reception power supplying unit generates, as the reception signal, a target detection reception signal when the reference phase shift amount is set, wherein the signal processing circuit generates, as the difference signal, a target detection difference signal on the basis of the target detection reception signal and the reference signal, and feeds the target detection difference signal to the radar reflection cross section area calculator, wherein the radar reflection cross section area calculator calculates the radar reflection cross section area on the basis of the target detection difference signal, and feeds the calculated radar reflection cross section area to the phase difference detector, wherein the phase difference detector calculates a relative distance, a relative speed, and a relative angle with the target on the basis of the target detection difference signal, and adjusts the phase shift amount so that the radar reflection cross section area is maximum on the basis of the relative distance, the relative speed, the relative angle, and the radar reflection cross section area.

9. The radar sensor according to claim 8, wherein the signal processing circuit converts the target detection difference signal to the predetermined intermediate frequency signal, wherein the radar reflection cross section area calculator calculates the radar reflection cross section area on the basis of the converted target detection difference signal, wherein the phase difference detector calculates the relative distance, the relative angle, and the relative speed with the target on the basis of the converted target detection difference signal.

10. The radar sensor according to claim 8, wherein the phase difference detector corrects the transmission phase difference according to the difference between the distances from the plurality of transmission power supplying units to the reception power supplying unit.

11. The radar sensor according to claim 8, wherein the radar sensor includes a tilt angle detector that detects the shift of a beam radiation direction, wherein the phase difference detector feeds, to the tilt angle detector, a plurality of relative distances calculated for the same target and the relative angles corresponding to the respective relative distances when the radar reflection cross section area is maximum, wherein the tilt angle detector detects the shifts of the beam radiation direction on the basis of the plurality of relative distances and the relative angles corresponding to the respective relative distances.

12. The radar sensor according to claim 1, wherein the switching device is a switch.

13. The radar sensor according to claim 1, wherein the switching device is an electric power amplifier.

14. The radar sensor according to claim 1, wherein the reference signal is a millimeter wave signal.

* * * * *